United States Patent
Kwak et al.

(10) Patent No.: US 10,274,774 B2
(45) Date of Patent: Apr. 30, 2019

(54) LIQUID CRYSTAL DISPLAY AND METHOD FOR MANUFACTURING THE SAME

(71) Applicant: SAMSUNG DISPLAY CO., LTD., Yongin, Gyeonggi-Do (KR)

(72) Inventors: Chang Hun Kwak, Suwon-si (KR); Chul Huh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 541 days.

(21) Appl. No.: 13/741,706

(22) Filed: Jan. 15, 2013

(65) Prior Publication Data
US 2014/0049717 A1    Feb. 20, 2014

(30) Foreign Application Priority Data
Aug. 17, 2012   (KR) ........................ 10-2012-0090009

(51) Int. Cl.
| | | |
|---|---|---|
| *G02F 1/1335* | (2006.01) | |
| *G02F 1/1339* | (2006.01) | |
| *G02F 1/1362* | (2006.01) | |

(52) U.S. Cl.
CPC ...... *G02F 1/133512* (2013.01); *G02F 1/1339* (2013.01); *G02F 1/13394* (2013.01); *G02F 1/133514* (2013.01); *G02F 2001/13398* (2013.01); *G02F 2001/136222* (2013.01)

(58) Field of Classification Search
None
See application file for complete search history.

(56) References Cited

U.S. PATENT DOCUMENTS

| | | | |
|---|---|---|---|
| 2005/0128382 A1* | 6/2005 | Baek et al. | 349/106 |
| 2007/0002265 A1* | 1/2007 | Kwak et al. | 349/156 |
| 2007/0171337 A1* | 7/2007 | Kim | G02F 1/133512 349/110 |
| 2008/0049182 A1 | 2/2008 | Kawabe et al. | |
| 2010/0321617 A1* | 12/2010 | Jeon et al. | 349/110 |
| 2011/0080543 A1 | 4/2011 | Kohara et al. | |

(Continued)

FOREIGN PATENT DOCUMENTS

| | | |
|---|---|---|
| JP | 11212075 A | 8/1999 |
| KR | 1020070069829 A | 7/2007 |

(Continued)

*Primary Examiner* — Jessica M Merlin
*Assistant Examiner* — Mark D Teets
(74) *Attorney, Agent, or Firm* — Cantor Colburn LLP

(57) ABSTRACT

A liquid crystal display includes a lower substrate including a pixel area and a light blocking region, a thin film transistor layer on the lower substrate and including a gate line and a data line, a color filter on the thin film transistor layer and corresponding to the pixel area, a light blocking member on the color filter and corresponding to the light blocking region, an upper substrate facing the lower substrate, and a liquid crystal layer between the lower and upper substrates. The light blocking member includes a horizontal light blocking member extending along the gate line and a vertical light blocking member extending along the data line. The color filter includes a protrusion portion overlapping a portion of the horizontal light blocking member which is in the pixel area. A sub-column spacer includes the portion of the horizontal light blocking member overlapping the protrusion portion.

20 Claims, 6 Drawing Sheets

(56) References Cited

U.S. PATENT DOCUMENTS

2011/0216276 A1* 9/2011 Yang et al. .................. 349/108
2013/0329155 A1* 12/2013 Kwak et al. .................. 349/43

FOREIGN PATENT DOCUMENTS

| KR | 1020070082750 A | 8/2007 |
| KR | 1020080029397 A | 4/2008 |
| KR | 1020080082164 A | 9/2008 |
| KR | 1020110027986 A | 3/2011 |
| KR | 1020110075511 A | 7/2011 |

* cited by examiner

LIQUID CRYSTAL DISPLAY AND METHOD FOR MANUFACTURING THE SAME

This application claims priority to Korean Patent Application No. 10-2012-0090009 filed on Aug. 17, 2012, and all the benefits accruing therefrom under 35 U.S.C. § 119, the entire contents of which are incorporated herein by reference.

BACKGROUND (a) Field

The invention relates to a liquid crystal display and a method of manufacturing the same.

(b) Description of the Related Art

A liquid crystal display is one of the most common types of flat panel displays. The liquid crystal display includes two display panels on which electrodes are disposed, and a liquid crystal layer interposed therebetween. The liquid crystal display controls the intensity of transmitted light by rearranging liquid crystal molecules of the liquid crystal layer by applying the voltage to the electrodes.

Among the flat panel displays, the liquid crystal display generally has various structures in which field generating electrodes are provided in two display panels, respectively. Among the structures, one mainstream structure is a structure where a plurality of thin film transistors and pixel electrodes are arranged in a matrix form in one display panel (hereinafter, referred to as 'thin film transistor array panel'), color filters of red, green and blue are disposed in the other display panel (hereinafter, referred to as 'common electrode panel'), and a common electrode covers the entire surface thereof.

However, in such a liquid crystal display, since the pixel electrodes and the color filters are on different display panels, precisely aligning the pixel electrodes and the color filters may be difficult, and thus, an alignment error may occur. A structure such as a color filter on array ("COA") where the color filters and the pixel electrodes are disposed on the same display panel has been proposed to solve the problem.

Further, considering a bonding margin when the thin film transistor array panel and the common electrode panel are bonded, a light blocking member such as a black matrix should be manufactured to be larger than a miminal size. However, since an aperture ratio of the liquid crystal display may be deteriorated by the increased size of the black matrix, the black matrix may be disposed in the thin film transistor array panel.

A gap between the two display panels is called a cell gap, and the cell gap affects general operation characteristics of the liquid crystal display, such as a response speed, a contrast ratio, a viewing angle and luminance uniformity. If the cell gap is not constant, a uniform image is not displayed over an entire screen of the liquid crystal display causing undesirable defects in image quality. Therefore, a plurality of spacers are disposed on one side of the two display panels in order to maintain the uniform cell gap over the entire region of the two display panels.

A plurality of spacers may include a main column spacer substantially supporting the two display panels, and a sub-column spacer assisting the main column spacer.

In manufacturing a liquid crystal display, the light blocking member such as the black matrix, and the spacers, may be simultaneously formed in order to simplify a manufacturing process. Multiple processes are implemented in order to simultaneously form the light blocking member, the main column spacer, the sub-column spacer and the like.

In the multiple processes, a mask that can implement multiple transmittance areas and a material that facilitates the multiple processes are used. However, the multiple transmittance mask and corresponding material are limited. Therefore, there exists a need for an improved mask and/or material in the process of simultaneously forming light blocking and spacer elements of the liquid crystal display.

SUMMARY

One or more exemplary embodiment of the invention provides a liquid crystal display implemented in a multi-process method where a light blocking member and a spacer are simultaneously formed, and a method of manufacturing the same.

An exemplary embodiment of the invention provides a liquid crystal display including: a lower substrate including a pixel area and a light blocking region; a thin film transistor layer on the lower substrate, and including a thin film transistor, a gate line and a data line; a color filter on the thin film transistor layer and corresponding to the pixel area; a light blocking member on the color filter and corresponding to the light blocking region; an upper substrate facing the lower substrate; and a liquid crystal layer interposed between the lower substrate and the upper substrate. The light blocking member includes a horizontal light blocking member extending along the gate line of the thin film transistor layer, and a vertical light blocking member extending along the data line of the thin film transistor layer, the color filter includes a protrusion portion overlapping a portion of the horizontal light blocking member and a sub-column spacer includes the portion of the horizontal light blocking member overlapping the protrusion portion.

The sub-column spacer may be elongated in an extension direction of the gate line.

The liquid crystal display may further include: a main column spacer on the horizontal light blocking member or the vertical light blocking member, and maintaining a gap between the upper substrate and the lower substrate.

A height of the sub-column spacer may be greater than an average height of the light blocking member and lower than a height of the main column spacer.

The main column spacer may be at a crossing portion of the horizontal light blocking member and the vertical light blocking member.

The liquid crystal display may further include: a passivation layer and a pixel electrode between the color filter and the light blocking member. The pixel electrode may be at a portion corresponding to the pixel area.

The passivation layer may include an organic layer.

The liquid crystal display may further include a plurality of color filters, and the plurality of color filters may be island-shaped.

The horizontal light blocking member may overlap the thin film transistor, and the vertical light blocking member may overlap the data line.

The sub-column spacer may further include an end of the protrusion portion.

Another exemplary embodiment of the invention provides a method of manufacturing a liquid crystal display, the method including: providing a thin film transistor layer on a lower substrate including a pixel area and a light blocking region, providing a color filter on the thin film transistor layer and corresponding to the pixel area, and providing a light blocking member on the color filter and corresponding to the light blocking area. The light blocking member includes a horizontal light blocking member extending along a gate line of the thin film transistor layer, and a vertical light blocking member extending along a data line of the thin film transistor layer. The color filter includes a protrusion portion overlapping a portion of the horizontal light blocking member. A sub-column spacer includes the portion of the horizontal light blocking member overlapping the protrusion portion.

The sub-column spacer may be elongated in an extension direction of the gate line.

The method may further include providing a main column spacer on the horizontal light blocking member or the vertical light blocking member, where the main column spacer maintains a gap between the lower substrate, and an upper substrate facing the lower substrate.

A height of the sub-column spacer may be greater than an average height of the light blocking member, and lower than a height of the main column spacer.

The main column spacer may be provided at a crossing portion of the horizontal light blocking member and the vertical light blocking member.

The light blocking member may further include a main column spacer, and the forming of the light blocking member may include integrally forming the horizontal light blocking member and the main column spacer by using a two tone mask.

The method of manufacturing a liquid crystal display may further include forming a passivation layer on the color filter, and forming a pixel electrode on the passivation layer. The pixel electrode may correspond to the pixel area.

The passivation layer may include an organic layer.

The method of manufacturing a liquid crystal display may further include further comprising providing a plurality of color filters, wherein the color filters may be discontinuously provided in an extension direction of the data line, a contact hole which connects the pixel electrode and a drain electrode of a thin film transistor of the thin film transistor layer is formed in the passivation layer and the contact hole may be disposed between the color filters adjacent to each other.

The sub-column spacer may further include an end of the protrusion portion.

According to one or more exemplary embodiment of the invention, a display panel includes a step defined by a color filter protrusion portion protruding toward a light blocking region from a pixel area and overlapping a light blocking member corresponding to the light blocking region. The light blocking member may include a main column spacer and a sub-column spacer. At the same time the light blocking member is formed, a main column spacer may be formed.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
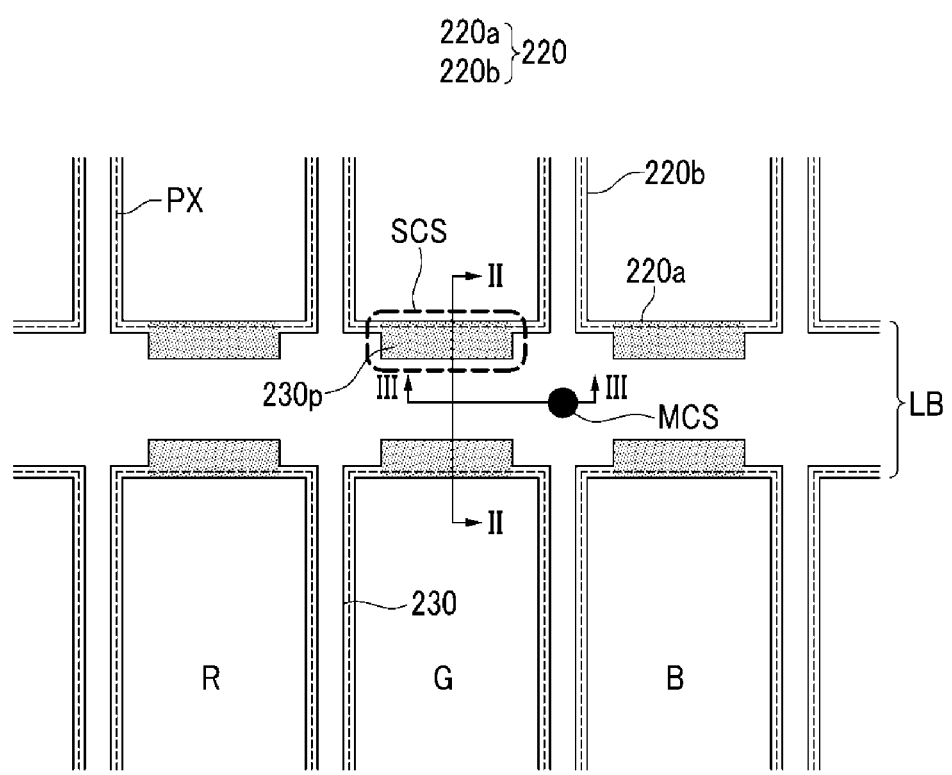
FIG. 1 is a top plan view showing an exemplary embodiment of a portion of a liquid crystal display according to the invention.

Hereinafter, exemplary embodiments of the invention will be described in detail with reference to the accompanying drawings. As those skilled in the art would realize, the described embodiments may be modified in various different ways, all without departing from the spirit or scope of the invention. On the contrary, exemplary embodiments introduced herein are provided to make disclosed contents thorough and complete and sufficiently transfer the spirit of the invention to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening them may also be present. Like reference numerals designate like elements throughout the specification. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "beneath" relative to other elements or features would then be oriented "above" relative to the other elements or features. Thus, the exemplary term "beneath" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 2:
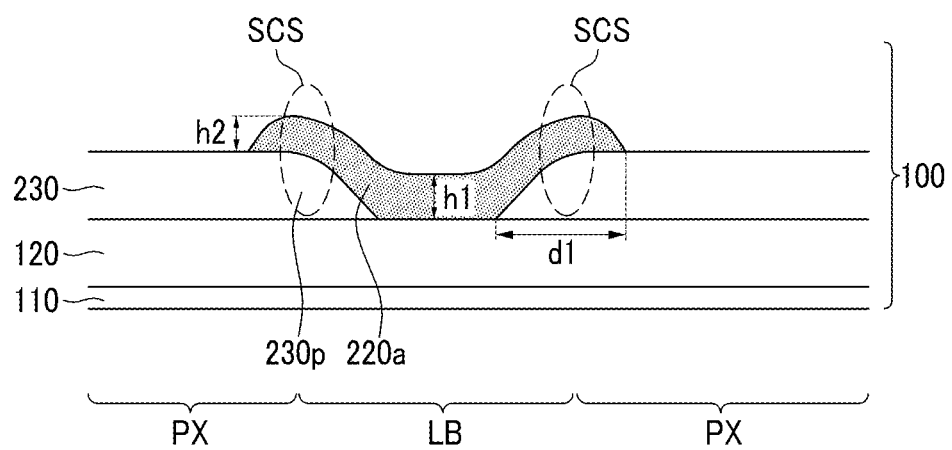
FIG. 2 is a cross-sectional view taken along line II-II of FIG. 1.
Figure 3:
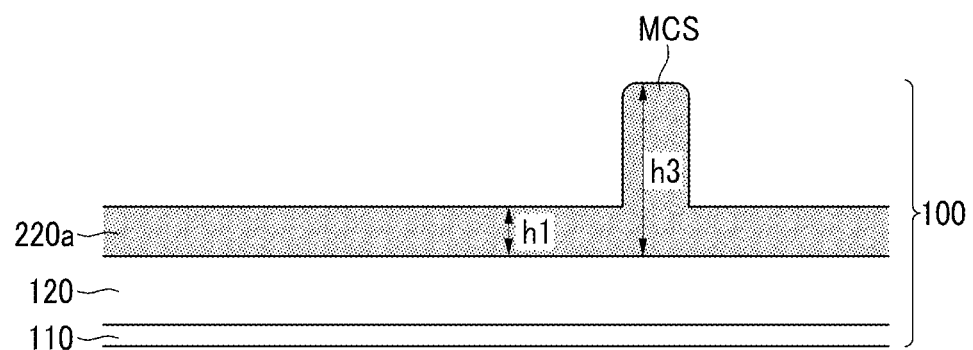
FIG. 3 is a cross-sectional view taken along line III-Ill of FIG. 1.

FIG. 1 is a top plan view showing an exemplary embodiment of a portion of a liquid crystal display according to the invention. FIG. 2 is a cross-sectional view taken along line II-II of FIG. 1. FIG. 3 is a cross-sectional view taken along line III-III of FIG. 1.

Referring to FIGS. 1 and 2, a layer structure 120 including a thin film transistor is positioned on a lower substrate 110. The layer structure 120 may further include include a gate line and a data line connected to the thin film transistor. The layer structure 120 may include a plurality of thin film transistors, a plurality of gate lines and/or a plurality of data lines on the lower substrate 110. The thin film transistor may include three terminals such as a control terminal, an input terminal and an output terminal as a switching element, and a detailed description thereof will be described below.

Referring to FIGS. 1 to 3, a color filter 230 is positioned on the layer structure 120. A plurality of color filters 230 may be positioned on the layer structure 120. The plurality of color filters 230 includes a red color filter R, a green color filter G and a blue color filter B that are arranged spaced apart from each other in a horizontal direction, that is, a left-right direction in FIG. 1. In an alternative exemplary embodiment, edges of color filters 230 adjacent to each other in the horizontal direction may overlap each other.

The plurality of color filters 230 is respectively positioned at a portion of the liquid crystal display corresponding to a pixel area PX indicated by a dotted line in FIG. 1. The plurality of color filters 230 is discontinuous in a vertical direction, that is, an up-down direction in FIG. 1. A portion of the liquid crystal display at which the color filter 230 is not positioned in the vertical direction corresponds to a light blocking region LB. In the illustrated exemplary embodiment, the color filter 230 includes a protrusion portion 230p protruding from a main portion of the color filter 230 in the pixel area PX. As illustrated in FIG. 1, each color filter 230 includes the protrusion portion 230p which protrudes upward or downward in the plan view, but is not limited thereto or thereby. While the protrusion portion 230p of the color filter 230 is illustrated to have a substantially rectangular, a planar shape of the protrusion portion 230p may be modified to have various shapes.

A light blocking member 220 is positioned on the color filter 230 and corresponds to the light blocking region LB. The light blocking member 220 includes a horizontal light blocking member 220a having a longitudinal axis which extends in the horizontal direction, and a vertical light blocking member 220b having a longitudinal axis which extends in the vertical direction. The edge of the light blocking member 220 may overlap the edge of the color filter 230.

The vertical light blocking member 220b may be positioned in a space between the color filters 230 adjacent in the horizontal direction, and may be connected to the horizontal light blocking member 220a. The vertical and horizontal light blocking members 220b and 220a may collectively form a single, unitary, indivisible member, but is not limited thereto or thereby. Where the edges of the color filters 230 adjacent to each other in the horizontal direction overlap each other, the vertical light blocking member 220b may be omitted.

In the illustrated exemplary embodiment, the protrusion portion 230p of the color filter 230 protrudes to a region in which the horizontal light blocking member 220a is positioned, and the protrusion portion 230p of the color filter 230 overlaps the horizontal light blocking member 220a. Referring to FIG. 2, in the illustrated exemplary embodiment, the horizontal light blocking member 220a overlaps the protrusion portion 230p of the color filter 230 by a first width d1 taken in the vertical direction in FIG. 1. The overlapping portion having the first width d1 in the vertical direction has a substantially rectangular planar shape having a longitudinal axis extending in the horizontal direction of FIG. 1. However, the shape of the overlapping portion is not limited to the rectangle, and the protrusion portion 230p of the color filter 230 may protrude to have alternative planar shapes such as a dumbbell, circle or oval shape.

Since the horizontal light blocking member 220a overlaps the protrusion portion 230p of the color filter 230 in the space between the color filters 230 adjacent to each other in the vertical direction, a step is formed, as shown in FIG. 2. Further, the overlapping portion of the horizontal light blocking member 220a and the protrusion portion 230p of the color filter 230 has the first width d1. A height h2 of the step between the horizontal light blocking member 220a and an end of the protrusion portion 230p of the color filter 230 may be increased as the first width d1 is increased.

As shown in FIGS. 2 and 3, an average height of the light blocking member 220 may be a first height h1. The overlapping portion of the horizontal light blocking member 220a and the protrusion portion 230p of the color filter 230 includes the first height h1 and the second height h2 to form a sub-column spacer SCS having a relatively high step.

As shown in FIGS. 1 and 2, two sub-column spacers SCS may be formed at the space between the color filters 230 adjacent to each other in the vertical direction. Alternatively, where the edge of only one color filter 230 includes the protrusion portion 230p at the space between the vertically adjacent color filters 230 and overlaps the horizontal light blocking member 220a, only one sub-column spacer SCS may be formed at the space between the verticall adjacent color filters 230.

A main column spacer MCS is positioned on the light blocking member 220. A plurality of main column spacers MSC may be positioned on the light blocking member 220. The main column spacer MCS may include a same material as the light blocking member 220. The main column spacer MCS, and the vertical and horizontal light blocking members 220b and 220a may collectively form a single, unitary, indivisible member, but is not limited thereto or thereby. In an exemplary embodiment of a method of manufacturing the liquid crystal display, the main column spacer MCS and the light blocking member 220 may be simultaneously formed such as by using a two tone mask. The main column spacer MCS has a third height h3 that is greater than the height h1 of the light blocking member 220, and greater than a total height (i.e., h1+h2) of the sub-column spacer SCS.

As described in FIGS. 1 to 3, according to the illustrated exemplary embodiment, the step between the horizontal light blocking member 220a and an end of the protrusion portion 230p of the color filter 230 may be enlarged to serve as the sub-column spacer SCS by overlapping the protrusion portion 230p of the color filter 230 and the light blocking member 220 in the light blocking region LB corresponding to the space between the adjacent color filters 230.

Hereinafter, the portion of the liquid crystal display shown in FIG. 1 will be described with reference to FIGS. 4 and 5.

Figure 4:
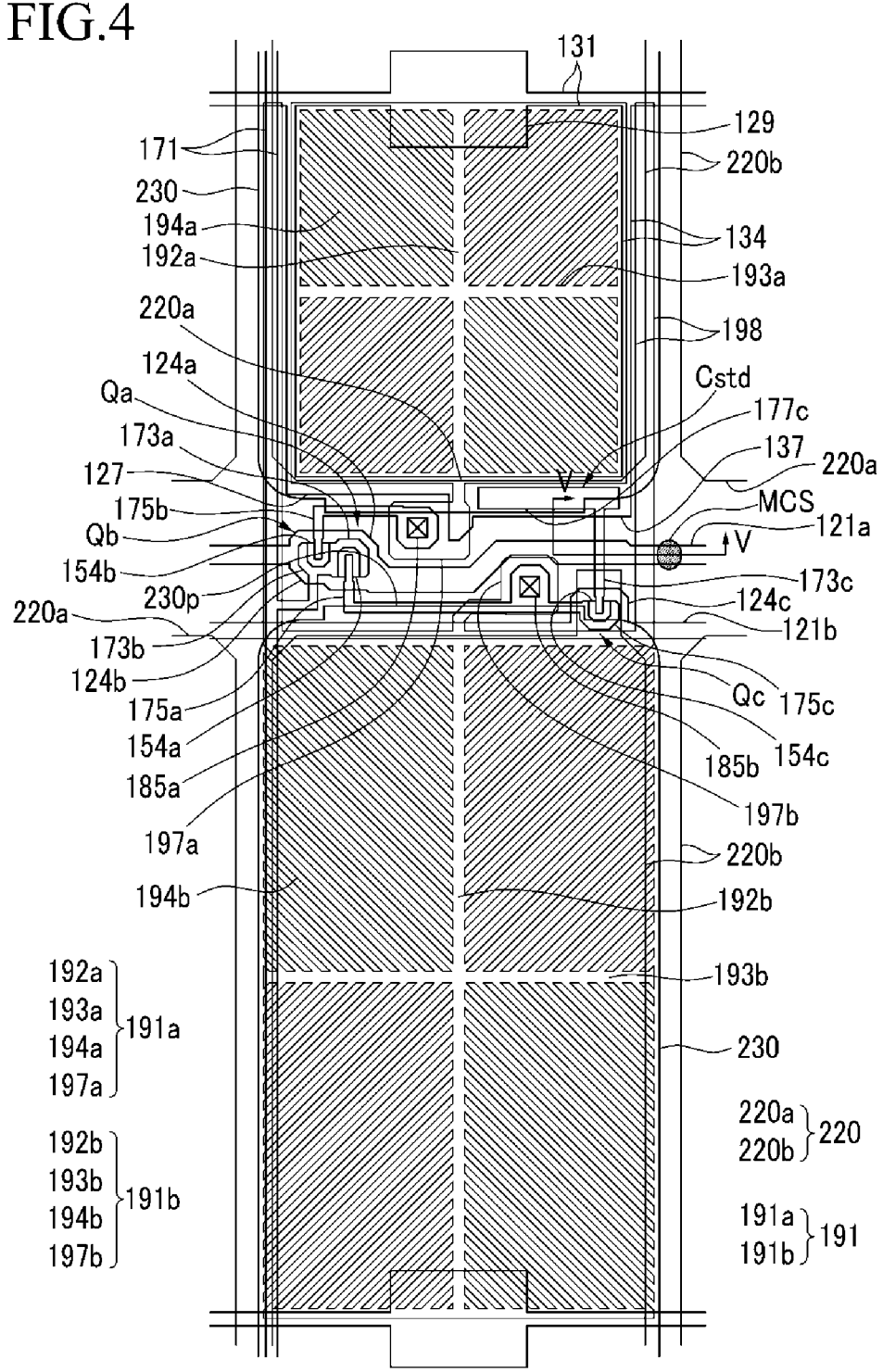
FIG. 4 is a top plan view showing another exemplary embodiment of a liquid crystal display according to the invention.

FIG. 4 is a top plan view showing another exemplary embodiment of a liquid crystal display according to the invention. FIG. 5 is a cross-sectional view taken along line V-V of FIG. 4. The liquid crystal display of FIG. 4 and FIG. 5 includes the elements shown in FIG. 1, but is not limited there to or thereby.

Figure 5:
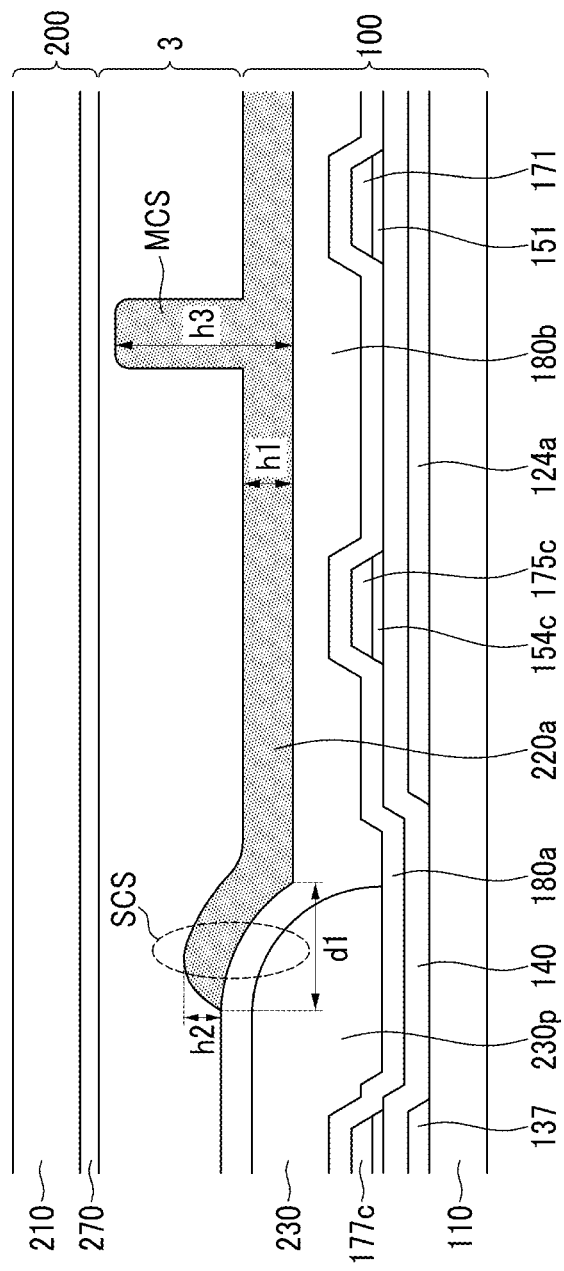
FIG. 5 is a cross-sectional view taken along line V-V of FIG. 4.

Referring to FIGS. 4 and 5, the liquid crystal display according to the illustrated exemplary embodiment includes a lower display panel 100 and an upper display panel 200 that face each other, and a liquid crystal layer 3 interposed between two display panels.

First, the lower display panel 100 will be described.

A gate conductor includes a plurality of gate lines including a first gate line 121a and a second gate line 121b, and a plurality of storage electrode lines 131 on the lower substrate 110 which includes the pixel area PX and the light blocking region LB.

The first and second gate lines 121a and 121b have a longitudinal axis which mainly extends in the horizontal direction, that is, a left-right direction in FIG. 4, and transfer a gate signal. The first gate line 121a includes a first gate electrode 124a and a second gate electrode 124b protruding upward and downward, respectively, from a main portion of the first gate line 121a. The second gate line 121b includes a third gate electrode 124c protruding upward from a main portion of the second gate line 121b. The first gate electrode 124a and the second gate electrode 124b are connected to each other to form one protrusion portion of the first gate line 121a.

The storage electrode lines 131 have a longitudinal axis which mainly extends in the horizontal direction and transfers a predetermined voltage such as a common voltage. Each of the storage electrode lines 131 may include a storage electrode 129 protruding upward and downward from a main portion of the storage electrode line 131, a pair of vertical portions 134 having a longitudinal axis which vertically extends downward and toward the first and second gate lines 121a and 121b, and a horizontal portion 127 connecting ends of the pair of vertical portions 134 to each other. The horizontal portion 127 includes a capacitive electrode 137 extending downward from a main portion of the horizontal portion 127.

A gate insulating layer 140 is on the gate conductor 121a, 121b and 131.

A semiconductor stripe 151 may include amorphous, crystalline silicon, or the like, and is on the gate insulating layer 140. The semiconductor stripe 151 has a longitudinal axis which mainly extends in the vertical direction. The semiconductor stripe 151 may include first and second semiconductors 154a and 154b respectively extending toward the first and the second gate electrodes 124a and 124b and connected to each other, and a third semiconductor 154c positioned on the third gate electrode 124c.

A plurality pairs of ohmic contacts (not shown) is on the first, second and third semiconductors 154a, 154b and 154c. The ohmic contacts may include a material such as n+ hydrogenated amorphous silicon to which silicide or an n-type impurity is doped at a high concentration, but is not limited thereto or thereby.

A data conductor includes a plurality of data lines 171, a plurality of first drain electrodes 175a, a plurality of second drain electrodes 175b, and a plurality of third drain electrodes 175c on the ohmic contacts.

The data lines 171 transfer a data signal, have a longitudinal axis which mainly extends in the vertical direction and crosses the first and second gate lines 121a and 121b. Each data line 171 includes a first source electrode 173a and a second source electrode 173b respectively extending toward the first gate electrode 124a and the second gate electrode 124b, and connected to each other. The first drain electrode 175a, the second drain electrode 175b and the third drain electrode 175c include a wide first end portion and a relatively uniform width rod-shaped second end portion. The rod-shaped second end portions of the first drain electrode 175a and the second drain electrode 175b are partially surrounded by the first source electrode 173a and the second source electrode 173b, respectively. The wide first end portion of the first drain electrode 175a further extends to form a U-shaped bent third drain electrode 175c. The wide first end portion 177c of the third source electrode 173c overlaps the capacitive electrode 137 to form a voltage drop capacitor Cstd, and the rod-shaped second end portion of the third source electrode 173c is partially surrounded by the third drain electrode 175c.

The first gate electrode 124a, the first source electrode 173a and the first drain electrode 175a form a first thin film transistor Qa together with the first semiconductor 154a. The second gate electrode 124b, the second source electrode 173b and the second drain electrode 175b form a second thin film transistor Qb together with the second semiconductor 154b. The third gate electrode 124c, the third source electrode 173c and the third drain electrode 175c form a third thin film transistor Qc together with the third semiconductor 154c.

The semiconductor stripe including the first semiconductor 154a, the second semiconductor 154b and the third semiconductor 154c may have a planar shape that is substantially the same as that of the data conductor 171, 173a, 173b, 173c, 175a, 175b and 175c, and the ohmic contacts therebeneath, with the exception of channel regions of the first, second and third thin film transistors Qa, Qb and Qb respectively between the source electrodes 173a, 173b and 173c and the drain electrodes 175a, 175b and 175c.

The first semiconductor 154a includes an exposed portion that is between and not covered by the first source electrode 173a and the first drain electrode 175a. The second semiconductor 154b includes an exposed portion that is between and not covered by the second source electrode 173b and the second drain electrode 175b The third semiconductor 154c includes an exposed portion that is between and not covered by the third source electrode 173c and the third drain electrode.

A first passivation layer 180a that may include an inorganic insulator such as silicon nitride or silicon oxide, is on the data conductor 171, 173a, 173b 173c, 175a, 175b and 175c and on the exposed portions of the semiconductors 154a, 154b and 154c.

A plurality of color filters 230 is positioned on the first passivation layer 180a. The plurality of color filters 230 may include a red color filter, a green color filter, and a blue color filter that are spaced apart from each other in the horizontal direction. The plurality of color filters 230 may have a longitudinal axis which extends in the vertical direction. The plurality of color filters 230 may be spaced apart from each other by the light blocking region LB. A color filter 230 among the plurality of color filters 230 may be positioned to correspond to the pixel area PX, and may include the protrusion portion 230p protruding toward the light blocking region LB.

A second passivation layer 180b is positioned on the plurality of color filters 230. The second passivation layer 180b may include an organic layer. In an exemplary embodiment, the second passivation layer 180b including the organic layer may include a first portion positioned directly on the plurality of color filters 230 and a second portion positioned directly on the first passivation layer 180a.

A pixel electrode 191 including a first sub-pixel electrode 191a and a second sub-pixel electrode 191b is on the second passivation layer 180b. The first sub-pixel electrode 191a and the second sub-pixel electrode 191b are separated from each other in the vertical direction with the first gate line 121a and the second gate line 121b interposed therebetween. A length of the second sub-pixel electrode 191b in the vertical direction may be approximately 1 to 3 times greater than that of the first sub-pixel electrode 191a, but is not limited thereto or thereby.

An overall shape of each of the first sub-pixel electrode 191a and the second sub-pixel electrode 191b is a quadrangle. The first sub-pixel electrode 191a and the second sub-pixel electrode 191b each includes a cross-type stem portion respectively formed by horizontal stem portions, 193a and 193b and vertical stem portions 192a and 192b crossing the horizontal stem portions 193a and 193b. Further, the first sub-pixel electrode 191a and the second sub-pixel electrode 191b each respectively includes a plurality of fine branch portions 194a and 194b, and protrusion portions 197a and 197b protruding from a lower end and an upper thereof.

Each of the sub-pixel electrodes 191a and 191b is respectively divided into four sub-regions by the horizontal stem portions 193a and 193b and the vertical stem portions 192a and 192b. The fine branch portions 194a and 194b inclinedly extend from the horizontal stem portions 193a and 193b and the vertical stem portions 192a and 192b. The fine branch portions 194a and 194b have a longituidnal axis extending in an extension direction, and the extension direction may form an angle of approximately 45° or 135° with the gate lines 121a and 121b, or with the horizontal stem portions 193a and 193b. Further, the fine branch portions 194a and 194b of two adjacent sub-regions within the sub-pixel electrode 191a and 191b may be orthogonal to each other.

In the illustrated exemplary embodiment, the first sub-pixel electrode 191a further includes an outer stem portion surrounding a periphery thereof. The first sub-pixel electrode 191a includes horizontal portions positioned on an upper end and a lower end thereof with respect to the vertical direction, and left and right vertical portions 198 positioned at the left and the right thereof. The left and right vertical portions 198 may prevent capacitive bonding, that is, coupling, between the data line 171 and the first sub-pixel electrode 191a. Alternatively, the left and right vertical portions 198 may be omitted.

In the illustrated exemplary embodiment, a pair of color filters 230 that are adjacent to each other in the vertical direction and spaced apart from each other may respectively correspond to the sub-pixel electrodes 191a and 191b included in a same one pixel area, but is not limited therto or thereby. Alternatively, a pair of color filters 230 that are adjacent to each other in the vertical direction and spaced apart from each other may respectively correspond to pixel electrodes included in two adjacent pixel areas.

The first passivation layer 180a and the second passivation layer 180b may include a plurality of first contact holes 185a and a plurality of second contact holes 185b through which the wide first end portion of the first drain electrode 175a and the wide first end portion of the second drain electrode 175b are exposed, respectively. The second contact hole 185ba may allow the second sub-pixel electrode 191b and the third drain electrode 175c to be connected therethrough, and the first contact hole 185a may allow the first sub-pixel electrode 191a and the second drain electrode 175b to be connected therethrough. In one exemplary embodiment, when the second passivation layer 180b includes the organic layer, the color filter 230 may not be in a portion corresponding to the light blocking region LB but may have an island shape in order to ensure a margin or area for the contact holes 185a and 185b.

The light blocking member 220 is positioned on the pixel electrode 191 and on the second passivation layer 180b. The light blocking member 220 includes the horizontal light blocking member 220a having a longitudinal axis extending in the horizontal direction, and the vertical light blocking member 220b having a longitudinal axis extending in the vertical direction. The edge of the light blocking member 220 may overlap the edge of the color filter 230, but is not limited thereto or thereby.

The vertical light blocking member 220b may be positioned in a space between the color filters 230 adjacent in the horizontal direction, and may be connected to the horizontal light blocking member 220a. Where the edges of the color filters 230 adjacent to each other in the horizontal direction overlap each other, the vertical light blocking member 220b may be omitted.

In the illustrated exemplary embodiment, the protrusion portion 230p of the color filter 230 protrudes to a region in which the horizontal light blocking member 220a is positioned, and the protrusion portion 230p of the color filter 230 overlaps the horizontal light blocking member 230a. Referring to FIG. 2, in the illustrated exemplary embodiment, the horizontal light blocking member 220a overlaps the protrusion portion 230p of the color filter 230 by a first width d1. The overlapping portion having the first width d1 has a substantially rectangular planar shape having a longitudinal axis extending in the horizontal direction. However, the shape of the overlapping portion is not limited to the rectangle, and the protrusion portion 230p of the color filter 230 may protrude to have alternative planar shapes such as a dumbbell, circle or oval shape.

Since the horizontal light blocking member 220a overlaps the protrusion portion 230p of the color filter 230 in the space between the color filters 230 adjacent to each other in the vertical direction, a step is formed, as shown in FIG. 5. Further, the overlapping portion of the horizontal light blocking member 220a and the protrusion portion 230p of the color filter 230 has the first width d1. A height h2 of the step between the horizontal light blocking member 220a and an end of the protrusion portion 230p of the color filter 230 may be increased as the first width d1 is increased.

Herein, the sub-column spacer SCS includes the step and has a greater height than the average height h1 of the light blocking member 220, taken from a common reference point. Specifically, the overlapping portion of the horizontal light blocking member 220a and the protrusion portion 230p of the color filter 230 has the overall height defined by the first height h1 and the second height h2, to form the sub-column spacer SCS having a relatively high step.

In FIG. 4, two sub-column spacers SCS may be formed at the space between the color filters 230 adjacent to each other in the vertical direction. Alternatively, the edge of only one color filter 230 includes the protrusion portion 230p at the space between the vertically adjacent color filters 230 and overlaps the horizontal light blocking member 220a, only one sub-column spacer SCS may be formed at the space between the vertically adjacent color filters 230.

The main column spacer MCS is positioned on the light blocking member 220. The main column spacer MCS may include a same material as the light blocking member 220. In an exemplary embodiment of a method of manufacturing the liquid crystal display, the main column spacer MCS and the light blocking member 220 may be simultaneously formed such as by using a two tone mask. The main column spacer MCS has a third height h3 that is greater than the height h1 of the light blocking member 220, and greater than a total height (i.e., h1+h2) of the sub-column spacer SCS. The main column spacer MCS serves as the spacer supporting a cell gap between the upper display panel 200 and the lower display panel 100. The sub-column spacer SCS serves to assist a role of the main column spacer MCS to support the cell gap between the upper display panel 200 and the lower display panel 100.

In the illustrated exemplary embodiment, the main column spacer MCS may be positioned at a crossing portion of the horizontal light blocking member 220a and the vertical light blocking member 220b, but is not limited thereto, and may be positioned at another portion of the light blocking member 220.

Next, in the upper display panel 200, a common electrode 270 is on an upper substrate 210, and an upper alignment layer (not shown) may be on the common electrode 270. The common electrode 270 transfers a common voltage.

The liquid crystal layer 3 has negative dielectric anisotropy, and liquid crystal molecules of the liquid crystal layer 3 are aligned so that long axes thereof are vertical to the surfaces of the two display panels 100 and 200 in a state in which there is no electric field. In one exemplary embodiment, the liquid crystal layer 3 may include an alignment assisting agent including reactive mesogen, and thus, the liquid crystal molecules have a pretilt so that long axes thereof are approximately parallel to a length direction of the fine branch portions 194a and 194b of the pixel electrode 191. In an alternative exemplary embodiment, the alignment assisting agent may be included in the alignment layer instead of the liquid crystal layer 3.

The structure of the thin film transistor array panel described with reference to FIGS. 4 and 5 is just an exemplary embodiment, and the layered structure including the thin film transistor may be modified to have various shapes.

Hereinafter, an exemplary embodiment of a method of manufacturing the liquid crystal display according to the invention will be described with reference to FIG. 6.

Figure 6:
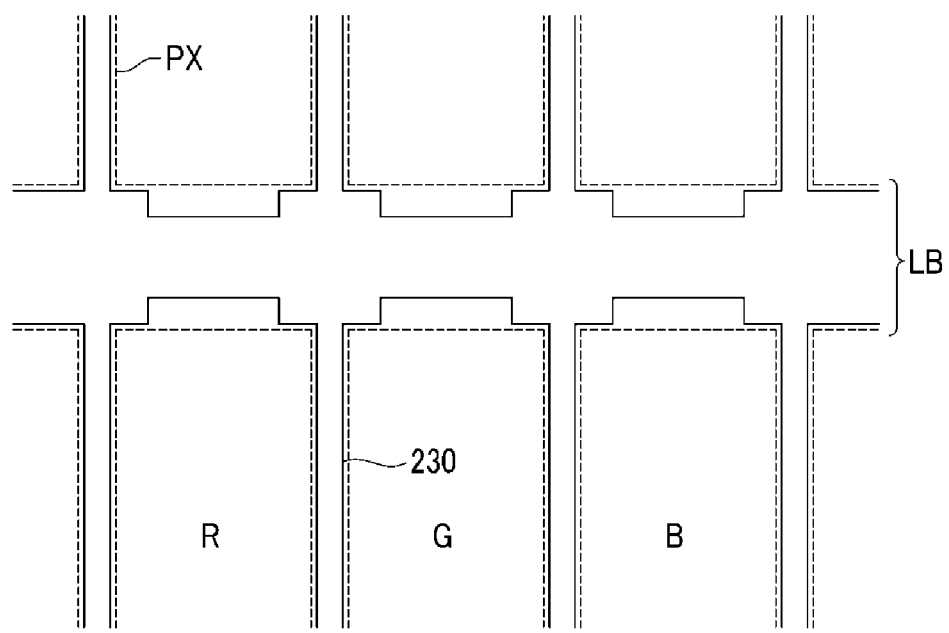
FIG. 6 is a top plan view showing an exemplary embodiment of a method of manufacturing a liquid crystal display according to the invention.

FIG. 6 is a top plan view showing an exemplary embodiment of a method of manufacturing a liquid crystal display according to the invention.

Referring to FIG. 6, a plurality of color filters 230 is arranged to be spaced apart from each other in the horizontal direction, that is, a left-right direction, and arranged to be spaced apart from each other in the vertical direction by the light blocking region LB. The plurality of color filters 230 may include red color filter R, a green color filter G and a blue color filter B that are sequentially repeated in the horizontal direction.

In the illustrated exemplary embodiment, each of the color filters 230 is elongated in the vertical direction and has the protrusion portion 230p protruding from a main portion of the color filter 230 in the pixel area PX. While the planar shape of the protrusion portion 230p is illustrated as a rectangle that is elongated in the horizontal direction, the shape of the protrusion portion 230p is not limited thereto, and the protrusion portion 230p may be modified to have various shapes. A width of the protrusion portion 230p taken perpendicular to a direction of elongation may be adjusted according to the desired height of the sub-column spacer SCS.

Even though description is omitted, as shown in FIGS. 4 and 5, after the layered structure including the thin film transistor is formed on the lower substrate 110, the method of manufacturing the liquid crystal display may include forming (e.g., providing) the color filter 230 on the thin film transistor.

In one exemplary embodiment, the color filter 230 may be formed by using a photolithography process, and in addition or alternative to this, may be formed by using an Inkjet method, and the like. After the passivation layer defining the contact hole and after the pixel electrode are formed on the color filter 230, the light blocking member 220 is formed. The light blocking member 220 includes the horizontal light blocking member 220a and the vertical light blocking member 220b formed along the space between the adjacent color filters 230. The vertical light blocking member 220b is formed between the color filters 230 adjacent to each other in the horizontal direction, and the horizontal light blocking member 220a is formed between the color filters 230 adjacent to each other in the vertical direction. In this case, the horizontal light blocking member 220a is formed to overlap the protrusion portion 230p of the color filters 230.

The horizontal light blocking member 220a is formed to cover the thin film transistor, and the two tone mask may be used to form the main column spacer MCS at the same time. Therefore, the light blocking member 220 and the main column spacer MCS may be formed simultaneously to have different heights. Since the formation of the light blocking member 220 and the main column spacer MCS is performed by using the two tone mask, the light blocking member 220 and the main column spacer MCS may be integrally formed of the same material, that is, form a single, unitary, indivisible member. In an exemplary embodiment, a half tone mask or a slit mask may be used in a process of using the two tone mask.

In one exemplary embodiment, for example, when the light blocking member 220 is formed, if a negative photoresist is used, light transmittance may be set to be substantially 100% in a region in which the main column spacer MCS is to be formed, and light transmittance may be set to be about 30% in an other region. After the photolithography process, the main column spacer MCS may be formed at a non-etched position of the photoresist, and the other region of the photoresist may be partially etched to form a remainder of the light blocking member 220 having a height smaller than that of the main column spacer MCS. A step may be formed at the overlapping portion of the horizontal light blocking member 220a and the protrusion portion 230p of the color filter 230, thus forming the sub-column spacer SCS that has an overall height larger than the average height of the light blocking member 220.

The method of manufacturing the liquid crystal display may further include, forming the upper display panel 200 including the common electrode 270 on the upper substrate 210, and bonding the upper display panel 200 to the lower display panel 100 formed separately. The liquid crystal layer 3 is provided between the upper and lower display panels 200 and 100, thus forming the liquid crystal display including the light blocking member 220 having the step and the column spacer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a lower substrate comprising a first pixel area, a second pixel area adjacent to the first pixel area, and a light blocking region between the first pixel area and the second pixel area;
    a thin film transistor layer on the lower substrate, and comprising a thin film transistor, a gate line and a data line;
    a color filter comprising a first color filter and a second color filter on the thin film transistor layer and respectively corresponding to the first pixel area and the second pixel area;
    a light blocking member on the color filters and corresponding to the light blocking region;
    an upper substrate facing the lower substrate; and
    a liquid crystal layer between the lower substrate and the upper substrate,
    wherein
    the light blocking member comprises a horizontal light blocking member lengthwise extending along a length extension direction of the gate line, and a vertical light blocking member lengthwise extending along a length extension direction of the data line,
    the first color filter comprises edges thereof lengthwise extending along the length extension of the gate line and along the length extension direction of the data line, and
    at a same boundary between the first pixel area and the horizontal light blocking member which lengthwise extends along the length extension direction of the gate line,
        the edges of the first color filter which lengthwise extend along the length extension direction of the gate line comprise a first edge and a second edge, the first edge being disposed further from the same boundary than the second edge, and
        a portion of the first color filter extends from a virtual extension of the second edge thereof to the first edge thereof, an entirety of the portion of the first color filter defining a protrusion portion of the first color filter,
    wherein the protrusion portion of the first color filter overlaps a portion of the horizontal light blocking member, wherein the protrusion portion defines a width thereof lengthwise extended along the length extension direction of the data line, and a length thereof lengthwise extended along the length extension direction of the gate line, the length being greater than the width, and
    wherein along the length extension direction of the gate line, the second edge of the color filter lengthwise extends further than the length of the protrusion portion at each of opposing sides of the protrusion portion.

2. The liquid crystal display of claim 1, wherein an end of the protrusion portion is defined by the first edge.

3. The liquid crystal display of claim 2, further comprising a main column spacer on the horizontal light blocking member or the vertical light blocking member, wherein the main column spacer maintains a gap between the upper substrate and the lower substrate.

4. The liquid crystal display of claim 3,
    wherein the protrusion portion overlapping the portion of the horizontal light blocking member is disposed non-overlapping the data line,
    wherein a sub-column spacer comprises the portion of the horizontal light blocking member overlapping the protrusion portion which is disposed non-overlapping the data line, and
    wherein a height of the sub-column spacer is greater than an average height of the light blocking member, and lower than a height of the main column spacer.

5. The liquid crystal display of claim 4, wherein the main column spacer is at a crossing portion of the horizontal light blocking member and the vertical light blocking member.

6. The liquid crystal display of claim 1, further comprising a passivation layer and a pixel electrode between the color filter and the light blocking member,
    wherein the pixel electrode corresponds to the pixel area.

7. The liquid crystal display of claim 6, wherein the passivation layer comprises an organic layer.

8. The liquid crystal display of claim 1, wherein each of the first color filter and the second color filter is island-shaped.

9. The liquid crystal display of claim 1, wherein the horizontal light blocking member overlaps the thin film transistor, and the vertical light blocking member overlaps the data line.

10. The liquid crystal display of claim 1, wherein a sub-column spacer is defined by the portion of the horizontal light blocking member overlapping with the protrusion portion of the first color filter.

11. A method of manufacturing a liquid crystal display, the method comprising:
    providing a thin film transistor layer on a lower substrate comprising a first pixel area, a second pixel area, and a light blocking region between the first pixel area and the second pixel area, the thin film transistor layer comprising a gate line, a data line and a thin film transistor which is connected to the gate and data lines;
    providing a color filter comprising a first color filter and a second color filter on the thin film transistor layer and respectively corresponding to the first pixel area and the second pixel area; and
    providing a light blocking member on the color filters and corresponding to the light blocking region,
    wherein the first and second pixel areas respectively corresponding to the first and second color filters are adjacent to each other in a length extension direction of the data line and dispose the thin film transistor therebetween, the light blocking member comprises a horizontal light blocking member lengthwise extending along a length extension direction of the gate line of the thin film transistor layer, a portion of the horizontal light blocking member being disposed between the first and second pixel areas adjacent to each other in the length extension direction of the data line and overlapping the thin film transistor, and at a same boundary between the first pixel area and the portion of the horizontal light blocking member,
- the first color filter comprises edges thereof which lengthwise extend along the length extension direction of the gate line and comprise: a first edge and a second edge among which the first edge is disposed further from the same boundary than the second edge,
- along a length extension direction of the gate line, the second edge extends further than the first edge at each of opposing ends of the first edge, and
- the thin film transistor is disposed between the first edge which is further from the same boundary than the second edge and the second pixel area which is adjacent to the first pixel area in the length extension direction of the data line.

12. The method of manufacturing a liquid crystal display of claim 11, wherein an end of the protrusion portion is defined by the first edge.

13. The method of manufacturing a liquid crystal display of claim 12,
wherein the light blocking member further comprises a vertical light blocking member lengthwise extending along a length extension direction of the data line of the thin film transistor layer,
further comprising:
providing a main column spacer on the horizontal light blocking member or the vertical light blocking member, wherein the main column spacer maintains a gap between the lower substrate and an upper substrate which face each other.

14. The method of manufacturing a liquid crystal display of claim 13,
wherein the protrusion portion overlapping the portion of the horizontal light blocking member is disposed non-overlapping the data line,
wherein a sub-column spacer comprises the portion of the horizontal light blocking member overlapping the protrusion portion which is disposed non-overlapping the data line, and
wherein a height of the sub-column spacer is greater than an average height of the light blocking member and lower than a height of the main column spacer.

15. The method of manufacturing a liquid crystal display of claim 14, wherein the main column spacer is provided at a crossing portion of the horizontal light blocking member and the vertical light blocking member.

16. The method of manufacturing a liquid crystal display of claim 11, wherein the light blocking member further comprises a main column spacer, and
the providing the light blocking member comprises integrally forming the horizontal light blocking member and the main column spacer by using a two tone mask.

17. The method of manufacturing a liquid crystal display of claim 11, further comprising
forming a passivation layer on the color filter; and
forming a pixel electrode on the passivation layer,
wherein the pixel electrode corresponds to the first and second pixel areas.

18. The method of manufacturing a liquid crystal display of claim 17, wherein the passivation layer comprises an organic layer.

19. The method of manufacturing a liquid crystal display of claim 18,
wherein the first pixel area and the second pixel area are discontinuously provided in an extension direction of the data line,
wherein a contact hole which connects the pixel electrode and a drain electrode of a thin film transistor of the thin film transistor layer is formed in the passivation layer, and
wherein the contact hole is disposed between the first color filter and the second color filter.

20. The method of manufacturing a liquid crystal display of claim 11,
wherein the protrusion portion overlapping the portion of the horizontal light blocking member is disposed non-overlapping the data line, and
wherein a sub-column spacer is defined by the portion of the horizontal light blocking member overlapping the protrusion portion which is disposed non-overlapping the data line.

* * * * *